United States Patent [19]

Charransol et al.

[11] 4,048,482
[45] Sept. 13, 1977

[54] ARRANGEMENT FOR CONTROLLING A SIGNAL SWITCHING SYSTEM AND A METHOD FOR USING THIS ARRANGEMENT

[75] Inventors: Pierre Charransol; Jacques Hauri; Roger Danis, all of Paris, France

[73] Assignee: Thomson-CSF, Paris, France

[21] Appl. No.: 660,676

[22] Filed: Feb. 23, 1976

[30] Foreign Application Priority Data

Feb. 25, 1975 France .......................... 75.05800

[51] Int. Cl.² .................... G06F 11/00; H04Q 3/42
[52] U.S. Cl. .................. 235/153 AE; 235/153 AK
[58] Field of Search .............. 235/153 AE, 153 AK; 340/146.1 BE, 172.5

[56] References Cited

U.S. PATENT DOCUMENTS

| | | | |
|---|---|---|---|
| 3,609,704 | 9/1971 | Schurter | 340/172.5 |
| 3,735,356 | 5/1973 | Yates | 340/172.5 |
| 3,833,798 | 9/1974 | Huber et al. | 235/153 AE |
| 3,848,116 | 11/1974 | Moder et al. | 235/153 AE |
| 3,921,149 | 11/1975 | Kreis et al. | 340/172.5 |
| 3,959,638 | 5/1976 | Blum et al. | 235/153 AK |
| 3,964,056 | 6/1976 | Charpentier et al. | 340/172.5 |
| 3,978,327 | 8/1976 | Huber | 235/153 AE |

Primary Examiner—Charles E. Atkinson
Attorney, Agent, or Firm—Oblon, Fisher, Spivak, McClelland & Maier

[57] ABSTRACT

In an electronic switching system, there is provided an arrangement which, without doubling the computers of the control units, enables the switching elements of the system to be controlled without interruption in the event of a failure affecting their control. To this end, the system comprises $n$ control units each with an independent store (memory). The program corresponding to two functions i.e. to the control of two groups of switching elements is written in the independent store of each unit. Exchange memories, interconnecting the independent stores in twos, enable the momentary data necessary for monitoring of the group of switching elements in charge of the control unit under failure to be transferred from this unit to the other unit holding, in its independent store, the program relating to the same group.

4 Claims, 2 Drawing Figures

ARRANGEMENT FOR CONTROLLING A SIGNAL SWITCHING SYSTEM AND A METHOD FOR USING THIS ARRANGEMENT

BACKGROUND OF THE INVENTION

This invention relates to a control arrangement adaptable to an electronic switching system comprising computers used as control units (C.U.).

The use of high-speed data processing circuits has brought about an increase (as compared to non-electronic switching systems) in the centralization of control functions. This centralization has many advantages, but it can make the system vulnerable to component failures if not properly handled. For example if no redundancy were provided it would be possible for a single component failure to cause a complete failure of the system. A duplication of central control computers is therefore necessary.

In view of what has been achieved in the field of telephonic or telegraphic switching, where reliability of operation is of particular significance, a distinction is drawn between arrangements with two control units and arrangements with multiple control units, multiple in this context meaning that the number of control units is greater than two.

Generally speaking, there are two main categories of control arrangements with two control units. In the first category, the two units normally work in parallel, each performing all the current functions, but for only half of the incoming signals. In the event of failure, one of the units handles all the traffic it can, but this presupposes a significant reconfiguration of the network because that part of the content of each store (memory) which is governed by the processed signals differs for the two stores.

In the second category, the two units work in microsynchronism, the second unit repeating the operations of the first, enabling them to be verified, and replacing the other unit in the event of failure. The disadvantage is the waste of the total processing capacity used.

In either category, the concentration of the intelligence and of the memory in only two control units makes the arrangement as a whole inflexible to a large extent and also makes it impossible rationally to adapt standardized control units to telephone or telegraph exchanges of different capacity.

Although it is of course possible to use control units comprising stores differing in capacity according to requirements, the other elements of the control units designed for the maximum capacity of traffic would become plethoric for a low density of traffic.

A control arrangement with multiple control units working in parallel for the various input signals, each operating for $(1/n)^{th}$ of the traffic, have also been proposed. As in the two categories of arrangements comprising two control units, each of the $n$ control units performs all the functions. In this way the control arrangement can be better adapted to the requirements of the network because it is sufficient to vary the number $n$.

However, at the risk of an enormous waste of memory capacity in regard to the permanent or semipermanent data relating to the nature of the operations to be carried out, there can be no question of providing each of the $n$ control units with its own store supplying it with all the necessary data.

In the known arrangement, the difficulty has been obviated by giving the $n$ control units a common store.

However, the principle of safety becomes illusory when the failure affects precisely the common store which then has to be doubled.

On the other hand, multiprocessing in one and the same store or in two identical stores gives rise to problems of logic (time sharing) and hardware (changing priority access logic) which increase in proportion as the number of control units varies.

The present invention relates to a control arrangement by which these various disadvantages may be obviated.

SUMMARY OF THE INVENTION

According to the invention, there is provided a control arrangement for a switching system comprising:

$n$ control units each consisting of a computer and of an independent store ($n$ integer greater than 2);

$p$ groups of switching elements, the operation of each group constituting one of $p$ functions ($p$ integer greater than 2);

$n(n-1)/2$ exchange stores of smaller capacity than the independent store;

and means for coupling each exchange store to a predetermined pair of control units so as to have each control unit capable to perform at least two predetermined functions.

BRIEF DESCRIPTION OF THE DRAWINGS

The invention is described in more detail in the following with reference to the accompanying drawings, wherein.

DESCRIPTION OF THE PREFERRED EMBODIMENTS

In the Figures, the multiple connections between two elements have been symbolized by a single continuous line provided with two oppositely directed arrows in the case of a two-way connection.

Figure 1:
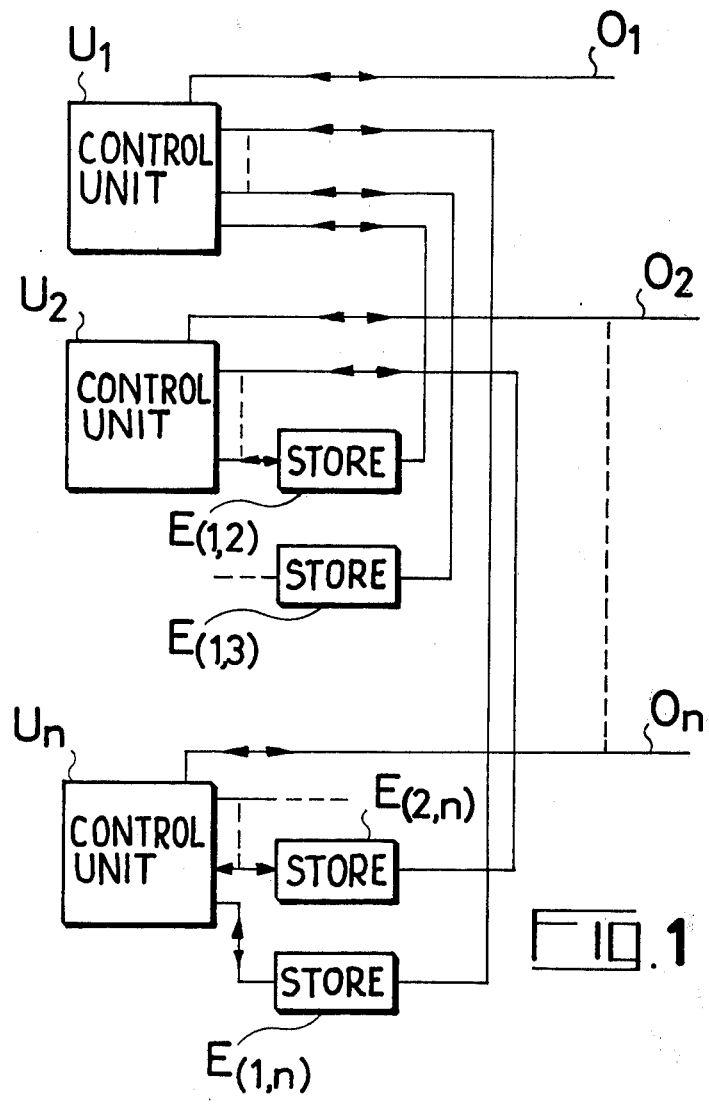
FIG. 1 diagrammatically illustrates the principle of a control arrangement according to the invention.

In FIG. 1, $n$ control units $U_1, U_2 \ldots U_n$, $n \geq 2$, of which only the first two and the last have been shown, each comprise an independent store (not shown). The $n$ control units are bilaterally connected in twos by $n(n-1)/2$ small exchange stores $E_{(1,2)}, E_{(1,3)}, E_{(1,n)}, E_{(2,n)}$, etc. . . .

The control arrangement comprises for $p$ functions $p$ pairs of control circuits $(C_1, D_1), (C_2, D_2), (C_i, D_i), (C_p, D_p)$ (not shown in FIG. 1) which are identical for each pair and each of which is intended to be installed between a control unit and a group of elements of which the control is a current function. The number $p$ is $\geq 2$ and $i$ is any number from 1 to $p$. By virtue of the fact that they are identical, one and/or the other of the circuits $C_i$ and $D_i$ may be connected to the same group of elements to be controlled. The control arrangement may optionally comprise other control circuits, each of which is intended to be installed at the output of a control unit to enable it to perform one of the non-current functions, such as handling conventional peripherals.

The method for using the control arrangement implies the writing into the independent store of two C.U., and only two, of that part of the control programme for controlling any group of elements which is independent of the switching system. Two operational states can exist for each C.U.:

i. normal operation, wherein each C.U. performs a predetermined function i.e. the control operation of a predetermined group of elements;

ii. failure of a C.U., wherein, under the control of a monitoring system, the necessary data for the control operation of said group of elements are transferred from the C.U. under failure to the C.U. which possesses that part of the control programme for controlling said group of elements.

Figure 2:
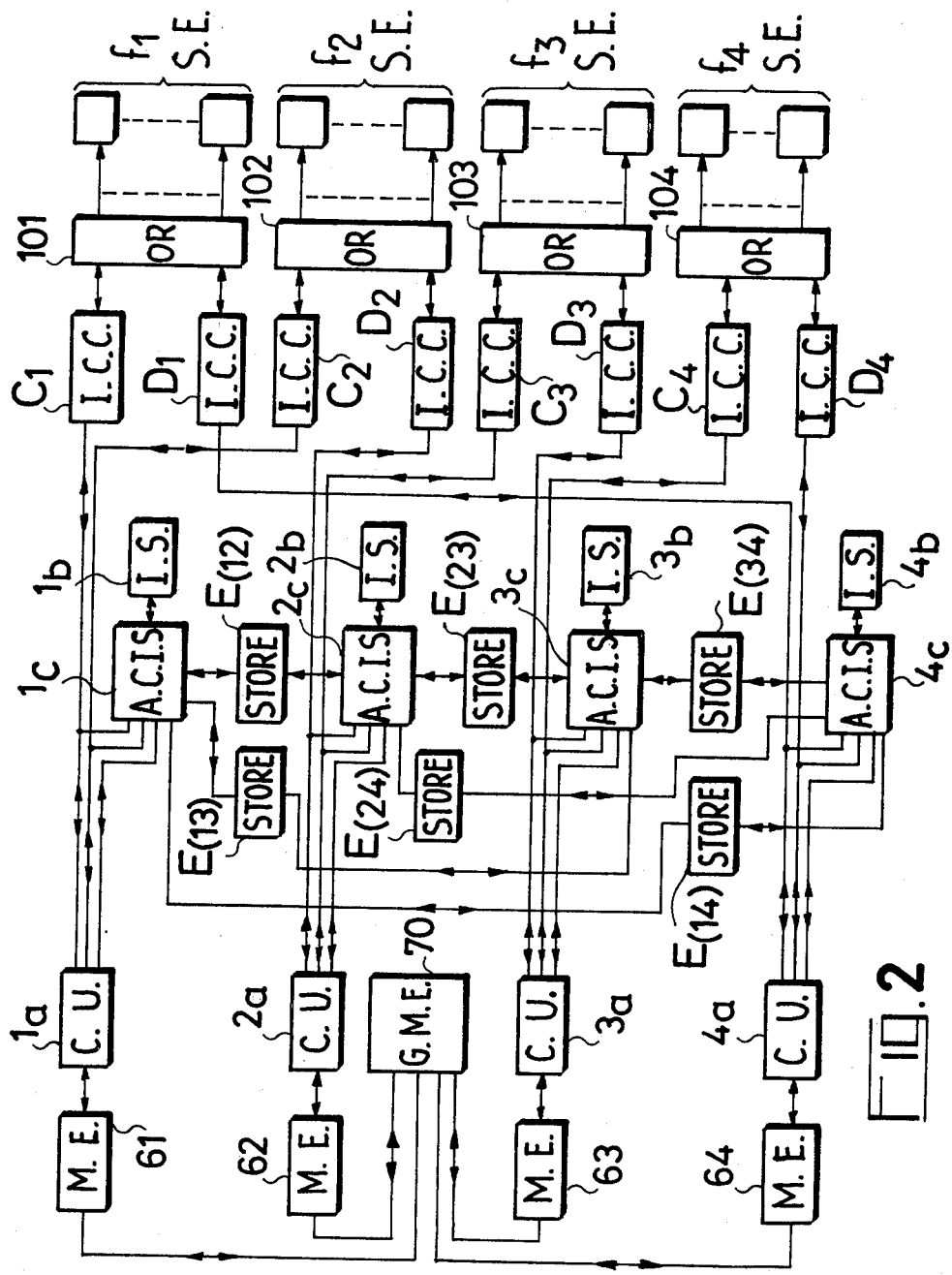
FIG. 2 illustrates one example of embodiment of the invention.

FIG. 2, which illustrates one example of an embodiment of the invention. It will be described at the same time as the method according to the invention.

In the interests of clarity, the following situation has been assumed to prevail:

There are only four functions: $f_i$ ($i = 1, 2, 3, 4$). Each function consists of the control of a group of switching elements.

The number of control units is four.

Each of the functions must be able to be performed by two control units. Each control unit is only designed for two functions. This results in the following scheme:

unit 1: functions $f_1$ and $f_2$
unit 2: functions $f_2$ and $f_3$
unit 3: functions $f_3$ and $f_4$
unit 4: functions $f_4$ and $f_1$ The function $f_1$ will be for example the control of scanners, the function $f_2$ the control of concentrators, etc. The distribution of the functions such as described above will be referred to as "graduated".

In FIG. 2, each of control units has been divided in the interests of clarity into blocks $i_a$, $i_b$ and $i_c$ ($i = 1, 2, 3$ and 4 successively), representing:

in the case of the blocks $1_b$, $2_b$ etc. . . the independent store (I.S.);

in the case of the blocks $1_c$, $2_c$ etc. . . the access circuit to the independent store (A.C.I.S.);

in the case of the blocks $1_a$, $2_a$ etc. . . the rest of the elements of each C.U.

The exchange stores $E_{1,2}$, $E_{1,3}$, $E_{1,4}$, $E_{2,3}$, $E_{2,4}$, and $E_{3,4}$, are also connected to the access circuits.

The intermediate control circuits (I.C.C.) between a control unit and a group of switching elements, whose control involves one and the same function, are doubled, namely $C_1$ and $D_1$ for the function $f_1$, $C_2$ and $D_2$ for the function $f_2$, $C_3$ and $D_3$ for the function $f_3$, $C_4$ and $D_4$ for the function $f_4$.

Each of the intermediate circuits $C_i$ and $D_i$ is connected to a certain number of switching elements (S.E.) for the function $f_i$ (symbolised by squares) through an "OR" circuit (represented by the block 101 or 102 or 103 or 104 according to the group of switching elements).

The intermediate circuits required for transmission in the adequate form of the commands of the control unit to be switching elements are also used for transmitting data relating to the state of the controlled units to the independent stores of the control units by way of access circuits 1c, 2c, 3c and 4c.

The operation of each control unit is monitored by a monitoring element (M.E.) denoted by the reference 60 + i connected bilaterally to the block ia, and a general monitoring element (G.M.E.) 70 is connected bilaterally to the four elements 60 + i. The monitoring elements 60 + i and 70 are conventional elements.

In the method according to the invention, the program required for carrying out the functions $f_i$, independently of the data variable according to the state of the network and transmitted to the control units by the intermediate circuits $C_i$ and $D_i$ are written into each of the independent stores of the two corresponding control units.

In the absence of failure, each control unit performs only one function, i.e. the unit $i$ performs the function $f_i$, the intermediate circuits D not being used.

The exchange stores are used for the data required for coordinating processing operations interrelated in regard to order, for example the various functions to be performed for the signals associated with the same address.

If a failure of the control unit 2 for example is detected by the monitoring element 62, the monitoring element interrupts the operation of the control unit 2 and general monitoring element 70 gives the alarm.

The control unit 2 is taken out of service while the couplings between units 1 and 2 are established by the A.C.I.S. It is then C.U. 2 is being repaired. The exchange store $E_{(1,2)}$ then enables the data associated with the signals being processed to be transferred to the I.S. $1_b$.

It should be noted that the C.U. 4 can also be taken out of operation without all the functions having to stop being performed.

It is also possible in normal operation to use each control unit for the two functions which it is capable of performing, but each for only half the traffic. The double couplings of FIG. 2 are then permanently used. In the event of a failure, for example in the control unit 2, the load of the control unit is distributed between the control units 1 (for $f_1$) and 3 (for $f_3$). In the manner previously described, the functions are divided into as many categories as there are control units. The effect of the graduated distribution is that each category is always processed by at least two control units and never more.

In certain cases, however, it may be preferable to divide the functions into a number greater than the number of control units, for example when the functions to be performed are very numerous. Assuming for example that there are four control units and six functions, the distribution of the virtual functions may be as follows: control unit

| control | 1 | $f_1$ | $f_2$ | $f_3$ | | | |
|---------|---|-------|-------|-------|-------|-------|-------|
|         | 2 | $f_1$ |       |       | $f_4$ | $f_5$ |       |
|         | 3 |       | $f_2$ |       | $f_4$ |       | $f_6$ |
|         | 4 |       |       | $f_3$ |       | $f_5$ | $f_6$ |

In normal operation, the effective functions may be distributed in such a way that each control unit performs all its virtual functions for half the traffic, its load being distributed between the other three in the event of failure. It should be noted that, in this example, the maintenance of the functions in the event of failure of a control unit leads to a better distribution than in the first case described above. It is in fact a question of generalising the notion of "graduation" of which the various cases discussed above were only intended to represent examples.

In practice, the particular arrangement may always be adapted in its dimensions to a given system in the following manner:

The preliminary choice of the number $n$ of control units will be based on the data processing capacity.

The total number of logical processing modules will then be divided into N approximately equal parts, $N = kn$ ($k$ integer).

The distribution of N between the $n$ control units will be such that each control unit will have to treat $q$ logical modules, such that:

$$q = 2N/n = 2K$$

The flexibility of this process in its practical application is very considerable and is only given with a view to forming a theoretical support for a measure readily carried out intuitively for low values of N and $n$.

The condition mentioned above is necessary if the same logical module is to reside in only two stores. It is sufficient for finding a solution (which is generally not exclusive).

Obviously, numerous additional modifications and variations of the present invention are possible in light of the above teachings. It is therefore to be understood that within the scope of the appended claims, the invention may be practiced otherwise than as specifically described herein.

1. A control arrangement for a switching system comprising:
- $n$ control units each including an independent store ($n$ integer greater than 2);
- $p$ groups of switching elements connected to said control units, each group capable of performing one of $p$ functions ($p$ integer greater than 2);
- $n(n-1)/2$ exchange stores of smaller capacity than the independent store;
- and means for coupling each exchange store to a predetermined pair of control units so as to have each control unit capable to perform at least two predetermined functions.

2. A control arrangement as claimed in claim 1, wherein said coupling means comprise:
- $p$ pairs of intermediate control circuits, each pair consisting of two interchangeable circuits connecting a predetermined group of switching elements with two predetermined control units;
- $n$ access circuits connected to two predetermined exchange stores and a predetermined independent store.

3. A method for using the control arrangement as claimed in claim 1, wherein that part of the control program for controlling any group of switching elements which is independent of the switching system is written into the independent store of two control units, and only two; wherein in the event of normal operation, each control unit performs a predetermined function i.e. the control operation of a predetermined group of switching elements; and wherein, in the event of failure of a control unit, the necessary data for the control operation of said group of switching elements are transferred from the control unit under failure to the control unit which possesses that part of the control program for controlling said group of switching elements.

4. A method as claimed in claim 3, wherein said switching system includes a plurality of logical processing modules and the total of logical processing modules of said system is divided into N approximately equal parts, $N = kn$ ($k$ being an integer greater than 1), the distribution of said parts between the control units being such that each of them processes $2k$ logical modules.

* * * * *